United States Patent
Simon

(10) Patent No.: US 7,758,922 B2
(45) Date of Patent: Jul. 20, 2010

(54) PRETREATMENT AND/OR PRECOATING OF NONABSORBENT SUBSTRATES AND/OR NONABSORBENT SUPPORT MATERIALS

(75) Inventor: Jens Simon, Hatzfeld (DE)

(73) Assignee: Tritron GmbH & Co. KG, Battenberg-Dodenau (DE)

( * ) Notice: Subject to any disclaimer, the term of this patent is extended or adjusted under 35 U.S.C. 154(b) by 335 days.

(21) Appl. No.: 11/839,654

(22) Filed: Aug. 16, 2007

(65) Prior Publication Data
US 2009/0104367 A1  Apr. 23, 2009

Related U.S. Application Data

(63) Continuation of application No. PCT/EP2006/000781, filed on Jan. 30, 2006.

(30) Foreign Application Priority Data
Feb. 17, 2005  (DE) .................. 10 2005 007 502

(51) Int. Cl.
*B05D 5/04* (2006.01)
(52) U.S. Cl. .................. 427/261; 427/258; 427/269; 427/287
(58) Field of Classification Search .............. 427/261, 427/258, 269, 287
See application file for complete search history.

(56) References Cited

U.S. PATENT DOCUMENTS

| | | | |
|---|---|---|---|
| 3,860,457 A | 1/1975 | Faessinger et al. | |
| 4,260,531 A | 4/1981 | Waechtel et al. | |
| 4,503,111 A * | 3/1985 | Jaeger et al. | 428/32.14 |
| 4,740,420 A * | 4/1988 | Akutsu et al. | 428/341 |
| 5,889,083 A | 3/1999 | Zhu et al. | |
| 5,958,169 A | 9/1999 | Titterington et al. | |
| 5,973,062 A | 10/1999 | Harris et al. | |
| 6,165,593 A * | 12/2000 | Brault et al. | 428/32.12 |
| 6,498,202 B1 | 12/2002 | Sun et al. | |
| 2003/0087991 A1* | 5/2003 | Engel et al. | 523/201 |

FOREIGN PATENT DOCUMENTS

| | | |
|---|---|---|
| DE | 10204143 | 7/2003 |
| EP | 0273583 | 7/1988 |
| EP | 0480362 | 4/1992 |
| EP | 0779347 | 6/1997 |

OTHER PUBLICATIONS

International Search Report, PCT/EP2006/000781, dated May 29, 2006.
International Preliminary Report on Patentability, PCT/EP2006/000781.

* cited by examiner

*Primary Examiner*—Frederick J Parker
(74) *Attorney, Agent, or Firm*—Henry B. Ward, III; Moore & Van Allen

(57) ABSTRACT

A method is disclosed of pretreatment and/or precoating of nonabsorbent substrates and/or nonabsorbent support materials, in particular of plastics, metals or glass, for ink printing or inkjet printing with water-based ink with a pretreatment solution and/or coating. The method includes applying at least one initiator which physically or chemically induces a sufficiently rapid reduction of the flowability of the ink to the substrate and/or support material, giving a defined ink distribution.

22 Claims, 1 Drawing Sheet

Figure 1:
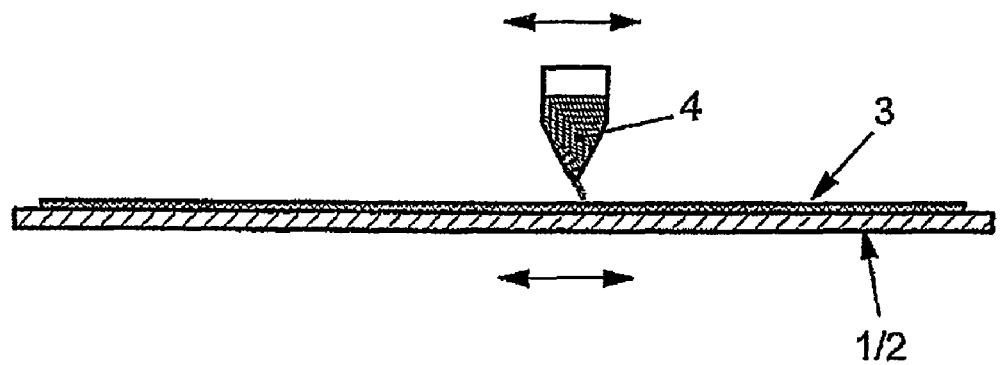

PRETREATMENT AND/OR PRECOATING OF NONABSORBENT SUBSTRATES AND/OR NONABSORBENT SUPPORT MATERIALS

CROSS-REFERENCE TO RELATED APPLICATIONS

This patent application is a continuation application of PCT/EP2006/000781 filed on Jan. 30, 2006, and hereby incorporates by reference application 102005007502.9 filed on Feb. 17, 2005.

BACKGROUND OF THE INVENTION

1. Field of the Invention

The present invention relates to a pretreatment and/or precoating of nonabsorbent substrates and/or nonabsorbent support materials, in particular of plastics, metals or glass, for ink printing or inkjet printing with water-based ink with a pretreatment solution and/or coating.

2. Description of Related Art

Nowadays, low-viscosity printing inks which are substantially produced as water-based printing inks are used for ink printing or inkjet printing. The leveling thereof is controlled by the nature of the substrate or of the support material. It is frequently disadvantageous that, in the case of changing substrates and support materials, in the case of changing printing speeds and in the case of changing compositions of the ink, the printing ink or ink levels or flows differently and the inscription is blurred or does not adhere sufficiently and the typeface or the imprint becomes fuzzy owing to the flow behavior. The conventional inkjet printing is a non-contact form of digital printing in which printing inks are divided into individual volume units or drops and are applied as a function of time and position to any desired substrate or support material.

Inkjet printing also comprises, inter alia, continuous inkjet (CIJ) printing, discontinuous, thermally or piezoelectrically activated ink printing (drop on demand, DoD) and electronically controlled spray techniques, such as, for example, air brush.

For inkjet printing, printing inks of different colors are printed side by side within a screen depending on the color order system, the screen determining the resolution of the print. The ink printed onto the substrate or the support material levels as a function of the interfacial tension formed between the applied ink and the support material and as a function of the structure of the support material or substrate itself. The leveling rate is determined by the flowability of the printed-on ink as film formation progresses.

The leveling of the ink or printing ink in turn determines the coverage and the ink distribution, so that the ink wets the substrate or the support material as completely as possible in the sense of high coverage and is distributed as uniformly as possible in the sense of a homogeneous ink distribution, giving a defined ink distribution without running into one another or mixing, which is undesired.

Low-viscosity inks for inkjet printing, whose film formation is determined in terms of time by the solvent evaporation, necessitate control of the influencing parameters decisive for the leveling of the ink, such as interfacial tension and flowability, in order to give a good print quality. This control has been insufficiently solved.

The print quality is controlled, in the sense of suitable interfacial tension, conventionally by a chemical pretreatment (cleaning, pickling, chromating, phosphating, paint removal, oxyfluorination), a physical pretreatment (flame application, corona discharge, plasma treatment) or a permanent coating or precoating, which ensures a wetting interfacial tension providing high coverage and a homogeneous ink distribution. The conventional methods for controlling the interfacial tension are not universally applicable but to a high degree substrate-specific.

On the other hand, the print quality is controlled in the sense of suitable leveling behavior conventionally by accelerating the decrease in the flowability of the applied, low-viscosity printing ink physically (drying by means of heat, convection drying) or photophysically (UV drying) as film formation progresses, in order to prevent the ink from running into one another and mixing and thus to obtain a defined ink distribution. As a rule, a considerable technical effort is associated therewith.

BRIEF SUMMARY OF THE INVENTION

It is an object of the invention to provide universally applicable pretreatments or precoatings on nonabsorbtive substrates or support materials, such as plastics, metals and glass, which, if required, ensure wetting interfacial tensions in the sense of high coverage and a homogeneous ink distribution, and to provide inks which, when applied to such pretreatments or precoatings, prevent the applied volume units from running into one another or mixing and hence give a defined ink distribution. By means of these pretreatments or precoatings, exact control of the flowability of the inks, of the film formation, of the pigment mobility and, if required, of the interfacial tension should be universally possible without considerable technical effort.

The features of the defining clauses of claim 1 and those of the dependent claims lead to the achievement of this object.

In the present invention, it has proven particularly advantageous to apply to a nonabsorbtive substrate or support material, before application of the ink, a temporary or permanent precoating, in particular a coating, which is suitable for sufficiently reducing the flowability of the applied ink, for example induced by flocculation or agglomeration, and/or to induce curing or polymerization of the applied ink.

Furthermore, the color-imparting colorants present in the ink should be permanently fixed on the coating or on the support material or substrate.

It has proven particularly advantageous to choose a coating which comprises at least one initiator and, if required, at least one surface-active substance. The initiator is preferably a monomeric, oligomeric or polymeric acid or a polyvalent metal salt, such as, for example, $CaCl_2$ or $Ca(OH)_2$.

The surface-active substance is preferably a monomeric, oligomeric or polymeric surfactant or a hydrocolloid. Emulsifiers, wetting agents and dispersants are also meant thereby.

Particularly above the $pK_a$ value of the coating or above the $pK_a$ value of the initiator, the flow behavior of the ink applied to the pretreated substrate and/or to the coating can be controlled if acrylates, such as, for example, polyacrylates and/or polymethacrylates, whose solubility is pH-dependent, are added to the ink. In addition to the control of the flowability of the applied ink, the acidic effect of the initiator can serve for inducing subsequent curing, in particular subsequent thermal curing, by means of which the applied ink undergoes crosslinking. Amino resins together with cobinders, including low molecular weight cobinders, have proven useful for the crosslinking reaction.

In this way, exact control of the leveling behavior of the ink is possible. Under the influence of the acid, the applied ink thickens immediately.

It is thus possible to influence the flow behavior of the applied ink and the curing of the film forming, according to the $pK_a$ value of the initiator.

BRIEF DESCRIPTION OF THE SEVERAL VIEWS OF THE DRAWING(S)

Figure 2:
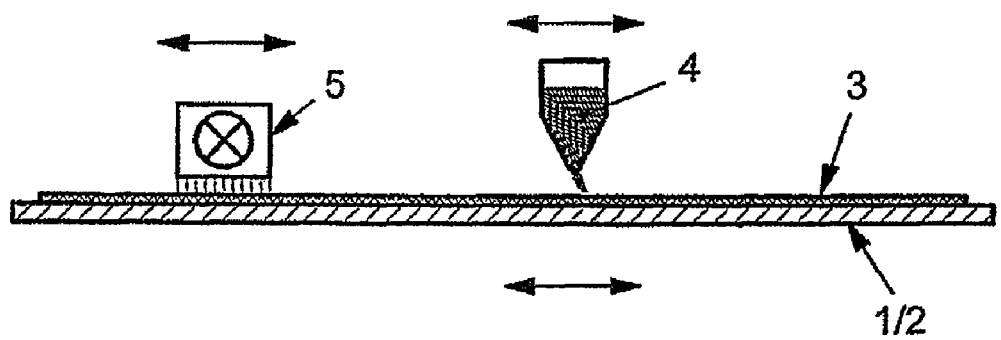

Further advantages, features and details of the invention are evident from the following description of preferred working examples and from the drawing; in the latter, FIG. 1 shows a schematic side view of a substrate and/or support material, coated with a precoating according to the invention which is printed by means of ink printing or inkjet printing; and FIG. 2 shows a schematic side view of a pretreatment of a substrate and/or support material, provided with a coating according to the invention on which printing is effected by means of ink printing or inkjet printing, as a further working example.

DETAILED DESCRIPTION OF THE INVENTION

According to FIG. 1, in the present invention, a substrate 1 and/or support material 2 has a coating 3 according to the invention which, with the substrate 1 or support material 2, can be applied in any desired coating method.

The coating 3 according to the invention serves for influencing the flow behavior of a water-based ink 4, applied by means of ink printing or inkjet printing, and/or the curing thereof.

The ink 4 is applied by means of conventional methods, ink printers or inkjet printers to the coating 3 or to the substrate 1 and/or support material 2.

Any desired nonabsorptive materials, such as plastics, metals, composite materials, foils, glass or the like, can be used as substrate 1 or support material 2.

Furthermore, the coating 3 is applied to the substrate 1 and/or support material 2 by coating methods such as dipping, roll-coating, casting, flooding or printing as non-atomizing coating methods. However, other coating methods, such as spray coating methods by spraying, atomization of liquid coatings, compressed-air spraying, airless- or high-pressure spraying methods and electrostatic spraying or powder-coating methods, are also possible for binding the coating 3 to the support material 2.

It should be within the scope of the present invention that the ink 4 of the inkjet print or ink print be applied to the coating 3 in a time- or space-dependent manner before the application of the ink 4 (inline) to the substrate 1 or support material 2. It should also be within the scope of the present invention that the ink 4 be applied to the substrate 1 or support material 2 independently of the application of the coating 3 with respect to time, it being possible for the ink 4 applied to the coating 3 or to the substrate 1 to be heat-treated, optionally by means of a heating device 5.

In the present invention, it has proven particularly advantageous that the coating 3 is produced or formed from at least one initiator and at least one surface-active substance. This is intended to effect or chemically induce a sufficiently rapid decrease or reduction of the flowability of the ink 4 applied to the coating 3 and/or substrate 1 or support material 2, in the sense of a defined ink distribution. The coating 3, consisting of initiator and surface-active substance, may be completely or partly volatile or may be soluble in the applied printing ink. The ink 4 binds to the coating 3 applied to the substrate 1 or to the support material 2.

It has proven advantageous to use a monomeric, oligomeric or polymeric surfactant, preferably anionic surfactants, cationic surfactants, amphosurfactants or miosurfactants, as a surface-active substance as a constituent of the coating 3. Hydrocolloids can also be used as the surface-active substance.

The surfactants may be emulsifiers, wetting agents and dispersants. The hydrocolloids may likewise be dispersants.

The substantial constituent in the present coating is the initiator, which is in the form of an acid, in particular in the form of a monomeric, oligomeric or polymeric acid. A mono- or polyfunctional carboxylic acid which has a $pK_a$ value of −6 to 15 is preferably used as the initiator. The initiator, which is preferably kept acidic, results in a reduction in the solubility of at least one component of the ink 4 applied to the substrate 1 or support material 2, in particular to the coating 3. The coating 3 or the acidic initiator can lead to the flocculation of a polymeric component or of a color-imparting component or to the agglomeration of pigments and hence to the immobilization of the ink 4 applied to the substrate 1.

In addition, the initiator may at least partly or completely induce a polymerization of the ink 4 applied to the coating 3 or to the substrate 1 and/or support material 2.

Furthermore it has proven advantageous in the present invention that an ink 4 is used which, in addition to the volatile constituents, has a composition which is at least partly polymerizable. This ink 4 according to the invention has a composition which, with a coating, permits optimized control of the leveling behavior or of the flow behavior.

By means of the initiator of the coating 3, a leveling behavior of the ink 4 can be appropriately controlled.

For this purpose, it has proven particularly advantageous to use an ink 4 which contains acrylates, preferably polyacrylates and/or polymethacrylates, as a constituent. The acrylates, in particular polyacrylates and/or polymethacrylates, may be present in an amount of up to 15% by weight as a constituent of the aqueous ink 4. In principle, all those polymers whose solubility is pH-dependent are suitable in this context.

In addition, the acidic initiator as a constituent of the coating 3 acts as an accelerator for the curing.

A preferred composition of a water polymerizable ink 4 comprises:

| | |
|---|---|
| solvent | 10-98% by weight |
| amino resin, in particular melamine-formaldehyde resins | 0.1-50% by weight |
| cobinders, including low molecular weight cobinders, such as bi-, tri-, oligo- or polyfunctional alcohols, inclusive and/or glycols or glycol ethers | 0-25% by weight |
| surface-active substances, such as monomeric, oligomeric or polymeric surfactants | 0-5% by weight |
| biocides, such as bactericides or fungicides | 0-5% by weight |
| pH stabilizers | 0-5% by weight |
| acrylates, in particular polyacrylates and/or polymethacrylates | 0-15% by weight |
| dispersants | 0-10% by weight |
| humectants | 0-20% by weight |
| colorants, in particular colored pigments | 1-10% by weight. |

This preferred composition of the ink 4 has a particularly advantageous effect with the coating, resulting from the pretreatment with a solution 3 of the following composition:

| | |
|---|---|
| solvent, water and/or alcohol | 80-100% by weight |
| initiators, in particular inorganic and/or organic acids, such as, for example, monomeric, oligomeric or polymeric acids, in particular mono- or polyfunctional carboxylic acids | 1-50% by weight |
| surface-active substances, such as monomeric, oligomeric or polymeric surfactants, in particular anionic surfactants, cationic surfactants, amphosurfactants or nonionic surfactants | 0-25% by weight. |

The amino resin, in particular melamine-formaldehyde resin, present in the ink 4 is polymerized by the acidic initiator, the ink 4 binding with the coating 3 and/or with the substrate 1 and/or support material 2, optionally also with thermal acceleration, leveling behavior being controllable and flowability of the ink 4 being rapidly reducible. As a result of this, very highly stable, strongly adhering, very resistant and lightfast inscriptions or prints of inks 4 on any desired substrates 1 or support materials 2 are permitted by the coating 3, in particular precoating.

The invention claimed is:

1. A method of pretreatment of nonabsorbent substrates and/or nonabsorbent support materials for ink printing or inkjet printing with water-based ink with a pretreatment solution, the method comprising:
applying at least one initiator which physically or chemically, by reducing the solubility of at least one component of the ink, induces a reduction of the flowability of the ink, and which comprises at least one of a monomeric, oligomeric or polymeric acid, to the substrate and/or support material, giving a defined ink distribution.

2. The method according to claim 1, wherein the applying step comprises at least one of: applying a non-atomizing coating and
applying a spray coating.

3. The method according to claim 1, wherein the applying step comprises applying the initiator before the application of the ink to the substrate or support material.

4. The method according to claim 1, wherein the applying step comprises applying the ink to the substrates and/or support materials independently of the application of the initiator with respect to time.

5. The method according to claim 1, further comprising the step of binding the ink with the initiator and the substrate or support material, wherein the coating is soluble in the ink.

6. The method according to claim 1, wherein the pretreatment solution comprises at least one volatile component.

7. The method according to claim 1, wherein the pretreatment solution comprises a surface-active substance comprising at least one of a monomeric, oligomeric and polymeric surfactant and a hydrocolloid.

8. The method according to claim 7, wherein the surface-active substance comprises anionic surfactants, cationic surfactants, amphosurfactants or nonionic surfactants.

9. The method according to claim 7, wherein the surfactant comprises at least one of emulsifiers, wetting agents and dispersants.

10. The method according to claim 1, wherein the initiator has a $pK_a$ value of −6 to 15.

11. The method according to claim 1, wherein the initiator comprises at least one of a mono- or polyfunctional carboxylic acid.

12. The method according to claim 1, wherein the applied ink comprises at least one polymeric component and the pretreatment solution reduces the solubility of the at least one polymeric component in the applied ink.

13. The method according to claim 1, wherein the applied ink comprises at least one color-imparting component and the pretreatment solution reduces the solubility of the at least one color-imparting component.

14. The method according to claim 1, further comprising aggregating at least one component of the ink.

15. The method according to claim 14, wherein the applied ink comprises at least one polymeric component and wherein the aggregation step comprises at least one of the flocculation and agglomeration of at least one polymeric component of the ink.

16. The method according to claim 14, wherein the applied ink comprises at least one pigment component and wherein the aggregation step comprises at least one of the flocculation and agglomeration of at least one pigment component of the ink.

17. The method according to claim 1, further comprising inducing a partial polymerization of the ink.

18. The method according to claim 1, further comprising inducing a complete polymerization of the ink.

19. The method according to claim 1, further comprising inducing at least one of a partial or complete polymerization of the ink, wherein the polymerization of the ink is effected without or with thermal acceleration.

20. The method according to claim 19, further comprising inducing at least one of a partial or complete polycondensation of the ink.

21. The method of claim 1, wherein the pretreatment comprises precoating.

22. The method of claim 1, wherein the pretreatment solution is a coating solution.

* * * * *